(12) United States Patent
Marquie et al.

(10) Patent No.: US 11,585,236 B2
(45) Date of Patent: Feb. 21, 2023

(54) TURBOJET BEARING SUPPORT PRODUCED BY ADDITIVE MANUFACTURING

(71) Applicant: SAFRAN AIRCRAFT ENGINES, Paris (FR)

(72) Inventors: Dimitri Daniel Gabriel Marquie, Moissy-Cramayel (FR); Adrien Jacques Philippe Fabre, Moissy-Cramayel (FR); Frédéric Patard, Moissy-Cramayel (FR); Pierre Jean-Baptiste Metge, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 185 days.

(21) Appl. No.: 16/982,795

(22) PCT Filed: Mar. 20, 2019

(86) PCT No.: PCT/FR2019/050630
§ 371 (c)(1),
(2) Date: Sep. 21, 2020

(87) PCT Pub. No.: WO2019/180375
PCT Pub. Date: Sep. 26, 2019

(65) Prior Publication Data
US 2021/0062679 A1 Mar. 4, 2021

(30) Foreign Application Priority Data
Mar. 23, 2018 (FR) .................................. 18 52557

(51) Int. Cl.
*F01D 25/16* (2006.01)
*F01D 25/18* (2006.01)
*B33Y 80/00* (2015.01)

(52) U.S. Cl.
CPC ......... *F01D 25/164* (2013.01); *F01D 25/183* (2013.01); *B33Y 80/00* (2014.12);
(Continued)

(58) Field of Classification Search
CPC ..... F01D 25/164; F01D 25/183; B33Y 80/00; F05D 2220/3213; F05D 2230/23;
(Continued)

(56) References Cited

U.S. PATENT DOCUMENTS

2014/0174858 A1 6/2014 Remer et al.
2015/0224743 A1 8/2015 Schick et al.
(Continued)

FOREIGN PATENT DOCUMENTS

EP 3 214 273 A1 9/2017
FR 3 053 728 A1 1/2018

OTHER PUBLICATIONS

International Search Report and Written Opinion (with English translation of categories) dated Jul. 4, 2019 in PCT/FR2019/050630 filed on Mar. 20, 2019, 12 pages.
(Continued)

*Primary Examiner* — Yi-Kai Wang
(74) *Attorney, Agent, or Firm* — Oblon, McClelland, Maier & Neustadt, L.L.P.

(57) ABSTRACT

A bearing support designed to be secured to a stationary turbojet element for supporting a journal, including a cone which widens from a central portion for supporting the journal to a portion for securing to the stationary element, a cylindrical body extending the portion for securing to the stationary element while surrounding the cone, an upstream skirt carried by the cone for defining an upstream enclosure for the central portion, and at least one downstream revolution element carried by the cone for defining a downstream
(Continued)

enclosure for the central portion. The bearing support can be made as a single part produced by additive manufacturing.

10 Claims, 4 Drawing Sheets

(52) U.S. Cl.
CPC .. *F05D 2220/3213* (2013.01); *F05D 2230/23* (2013.01); *F05D 2240/50* (2013.01); *F05D 2260/98* (2013.01)

(58) Field of Classification Search
CPC ............. F05D 2240/50; F05D 2260/98; F05D 2230/22; F05D 2230/31; F05D 2230/53; B22F 5/009; B22F 10/20; Y02P 10/25; Y02T 50/60
USPC .......................................................... 384/99
See application file for complete search history.

(56) References Cited

U.S. PATENT DOCUMENTS

| | | |
|---|---|---|
| 2015/0308502 A1 | 10/2015 | Hiller et al. |
| 2015/0337664 A1* | 11/2015 | Cosi .......................... F01D 5/18 |
| | | 416/232 |
| 2016/0290164 A1 | 10/2016 | Liebl et al. |
| 2017/0241343 A1* | 8/2017 | Manteiga .................. F02C 3/04 |
| 2018/0051706 A1* | 2/2018 | DiBenedetto ....... F16C 33/6637 |
| 2019/0112983 A1 | 4/2019 | Manteiga et al. |
| 2019/0211875 A1* | 7/2019 | Morreale .................. F02C 7/06 |

OTHER PUBLICATIONS

French Search Report (with English translation of categories) dated Nov. 23, 2018 in French Application No. 1852557 filed on Mar. 23, 2018, 3 pages.

\* cited by examiner

TURBOJET BEARING SUPPORT PRODUCED BY ADDITIVE MANUFACTURING

TECHNICAL FIELD

The present invention relates to the formation of an aircraft engine bearing support by additive manufacturing.

GENERAL CONTEXT OF THE INVENTION

A bypass turbojet includes an input sleeve receiving the air upstream which is sucked by a low-pressure compressor, before being divided into a central primary flow and a secondary flow surrounding the primary flow. After having passed the low-pressure compressor, the secondary flow is propelled downstream to generate a thrust by being blown around the primary flow, upstream and downstream being defined in relation to the direction of fluid flow in the turbojet.

After having passed the low-pressure compressor, the primary flow passes through a high-pressure compressor before reaching a combustion chamber. This primary flow is then expanded in a high-pressure turbine rotatably connected with the high-pressure compressor, then in a low-pressure turbine rotatably connected to the low-pressure compressor, before being expelled downstream.

In the case of a two-spool turbojet, the high-pressure compressor and the high-pressure turbine are part of a high-pressure body that surrounds a low-pressure journal by running at a speed that is different from the latter, this low-pressure journal carrying the low-pressure compressor and the low-pressure turbine.

The low-pressure journal and the high-pressure body are carried upstream and downstream, by bearings housed in enclosures that isolate them from the rest of the engine. Each bearing is lubricated by oil circulating in the enclosure that surrounds it, and that is defined by stationary elements and by the rotating element that passes through it. Such a bearing is carried by a support while being surrounded by the enclosure.

FIG. 1 shows according to a design possibility that the invention proposes to improve, a section of a portion of a turbojet 1 shows a low-pressure journal 2, at the downstream end of which a ferrule 3 is secured that extends radially to be secured to discs 4 of a low-pressure turbine 5 extending around a downstream portion of the journal 2.

The journal 2 is surrounded in the downstream region thereof by a bearing support 6 that carries a sleeve 7 intended to receive a roller bearing 8 to support the downstream portion of the journal 2, and that is secured to a stationary element 9 of the engine located at the upstream thereof, via a cone 10. This cone 10 widens from the downstream portion thereof where it is secured to the support 6, to the upstream portion thereof where it is secured to the stationary element 9.

The cone 10 is surrounded by a cylindrical element 11 secured to the upstream portion thereof that it extends downstream, to define with this cone 10 and with the ferrule 3 a portion of an enclosure 12 that encloses the bearing.

As can be seen in FIG. 2, a skirt 13 and two revolution bodies 14 and 15 extend the central region of the cone 10 respectively upstream and downstream, this skirt and these bodies having outer diameters of about the inner diameter of the cone 10. An upstream support 16 including a ring through which it is fastened to the upstream of the skirt 13 carries a segmented radial seal 17 that defines an enclosure 18 upstream from the bearing 8. The revolution element 14 jointly defines with the journal 2 two concentric enclosures 19 and 20 located downstream from the bearing 8.

In light of the manufacturing and mounting constraints related to the known techniques, these components, namely the support 6, the cone 10, the cylindrical element 11, the skirt 13, the element 14 and the upstream support 16 are fastened to one another according to different methods including in particular TIG welding.

As can be seen in more detail in FIG. 3, the sleeve 7 includes a main cylindrical portion engaged in the central region of the cone 10, and this main portion is extended by a squirrel cage portion via which this sleeve 7 is rigidly secured to an upstream end of the skirt 13.

Additionally, an annular space extending between the sleeve 7 and the central portion of the cone 10 is hydraulically pressurised, to radially constrain the sleeve 7 in order to ensure that it clamps the outer bearing ring that it receives when the engine is in service. Such an arrangement, also called compression damper or "squeeze film", is described in patent document EP1650449.

The segmented radial seal 17 has the upstream face thereof that is covered by a revolution flange 21 with a tapered inner edge that makes it possible to introduce a load loss upstream from this seal 17.

Additionally, a nozzle 22 that can be seen in FIG. 2 extends radially to introduce oil into the enclosure 18 to cool the seal 17 and lubricate the bearing 8. This oil is collected by a return path 23 that can be seen in FIG. 3 that places the lower portions of the enclosures 18, 19 and 20, in communication with an element or elements not shown in order to ensure the circulation and cooling thereof.

A design such as that of FIGS. 1 to 3 is the result of design and manufacturing solutions that the invention proposes to improve. Generally, designing and manufacturing a bearing support are complex and expensive operations that involve a multitude of processes.

The purpose of the invention is to provide a solution to overcome this disadvantage.

DISCLOSURE OF THE INVENTION

For this purpose, an object of the invention is a bearing support, intended to be secured to a stationary turbojet element for supporting a journal, characterised in that it includes:
  a tapered element which widens from a central portion for supporting the journal to a portion for securing to the stationary element;
  a cylindrical body extending the portion for securing to the stationary element while surrounding the tapered element;
  an upstream skirt carried by the tapered element for defining an upstream enclosure for the central portion;
  at least one downstream revolution element carried by the tapered element for defining a downstream enclosure for the central portion;
  and in that this bearing support is made as a single part produced by additive manufacturing.

This design and manufacturing solution makes it possible to reduce the size and the mass of the bearing support by suppressing in particular the bolted connection elements. It also makes it possible to reduce this mass due to the fact that the resistance to fatigue of the material produced by laser fusion is greater than that of the material produced by foundry, which makes it possible to reduce the quantity of material that constitutes the bearing support by reducing in particular the thickness thereof at different points.

The invention also relates to a bearing support thus defined, including an upstream support for a segmented radial seal extending the upstream skirt.

The invention also relates to a bearing support thus defined, including a nozzle protruding from an inner face of the upstream skirt in the upstream enclosure to cool and lubricate the upstream enclosure.

The invention also relates to a bearing support thus defined, including a sleeve intended to receive an outer roller bearing ring surrounding the journal, this sleeve being surrounded by the central portion, and wherein the sleeve is extended by a squirrel cage through which it is rigidly secured to an upstream end of the upstream skirt.

The invention also relates to a bearing support thus defined, wherein the sleeve is radially spaced from the central portion that surrounds it to define an annular space intended to receive a hydraulic flow.

The invention also relates to a bearing support thus defined, comprising a feed channel of the annular space surrounding the sleeve, this channel passing through the tapered element.

The invention also relates to a bearing support thus defined, comprising an oil return path connected to the upstream enclosure and/or to the downstream enclosure via a manifold, this oil return path passing through the tapered element.

Another object of the invention is a turbojet including a bearing support thus defined.

DETAILED DISCLOSURE OF PARTICULAR EMBODIMENTS

The idea at the basis of the invention is to form by additive manufacturing all of the bearing support including the cone with the central portion thereof for supporting the journal as well as the cylindrical element extending and surrounding this cone, with the upstream skirt and the downstream revolution elements that define the enclosures surrounding the central portion.

In practice, the invention makes it possible to integrate three functions directly into the blank part constituting the bearing support, namely a squirrel cage and a sleeve maintained by the latter, a support for a segmented radial seal, and a compression damper for the sleeve as well as other additional functions detailed in what follows.

Figure 1:
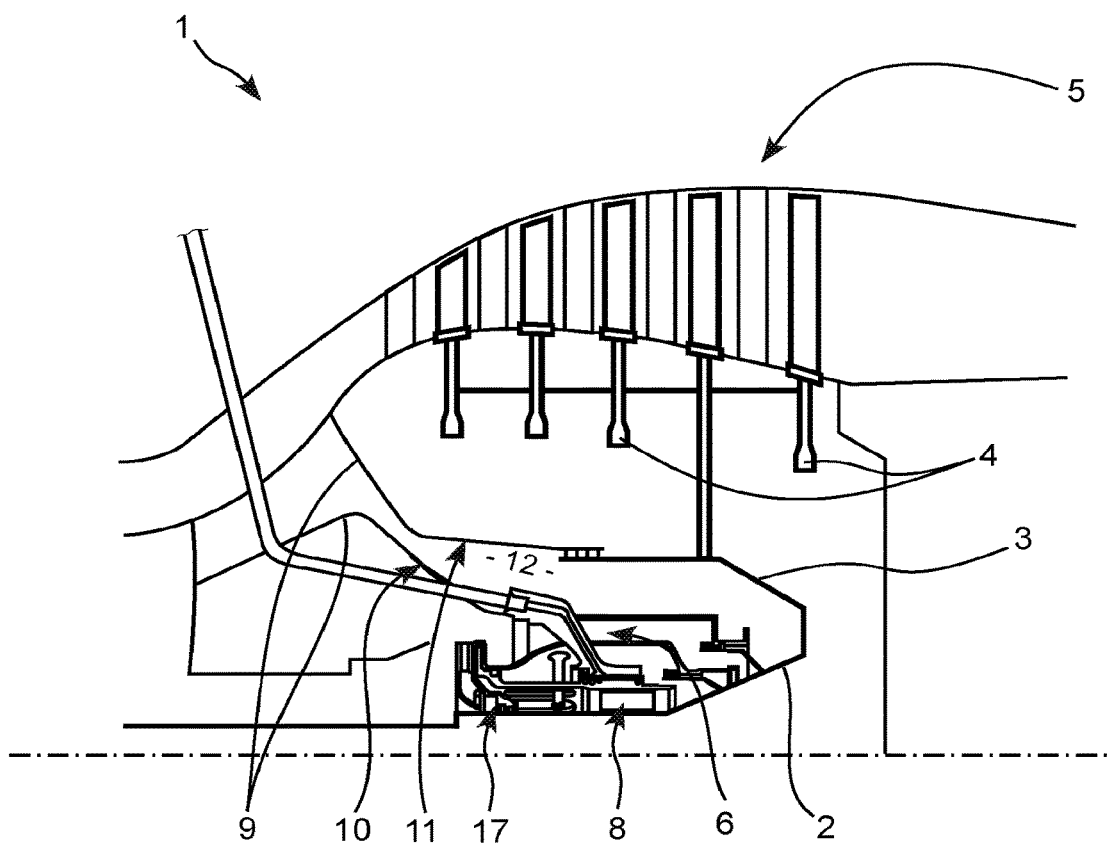
FIG. 1 already described is a diagrammatical cross-section view of a section of a downstream portion of a turbojet.
Figure 2:
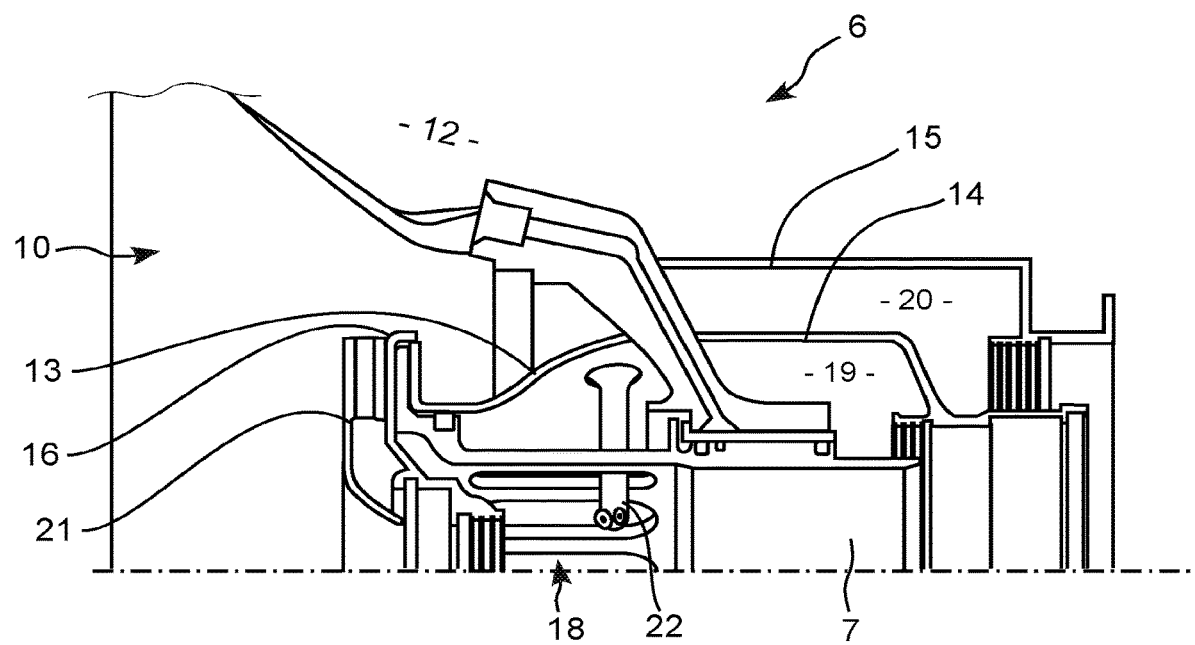
FIG. 2 already described is a cross-section view of a portion of a section of a downstream portion of a turbojet.
Figure 3:
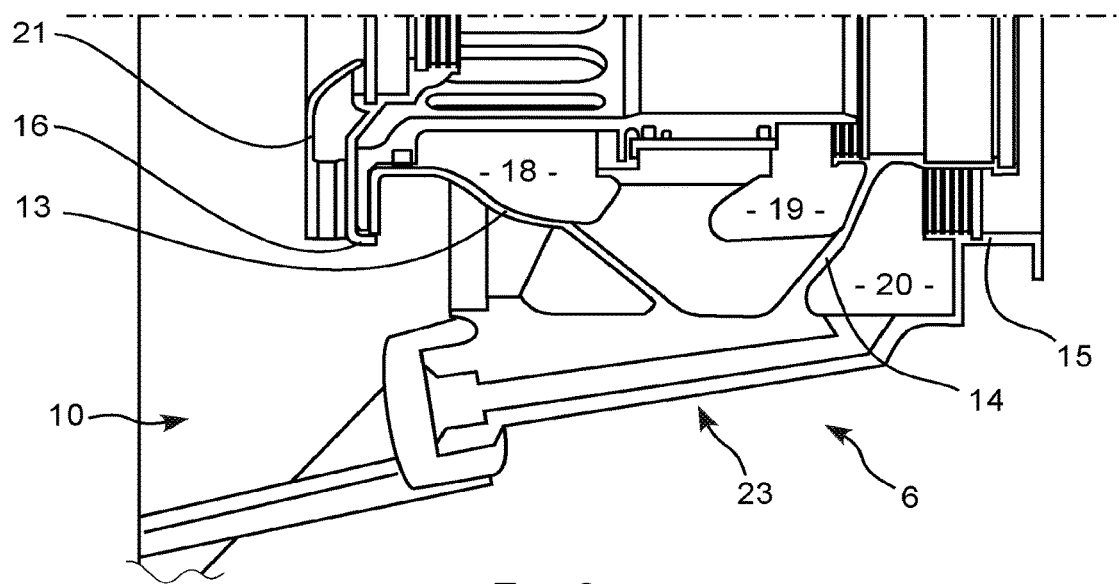
FIG. 3 already described is a cross-section half view of the bearing support.
Figure 4:
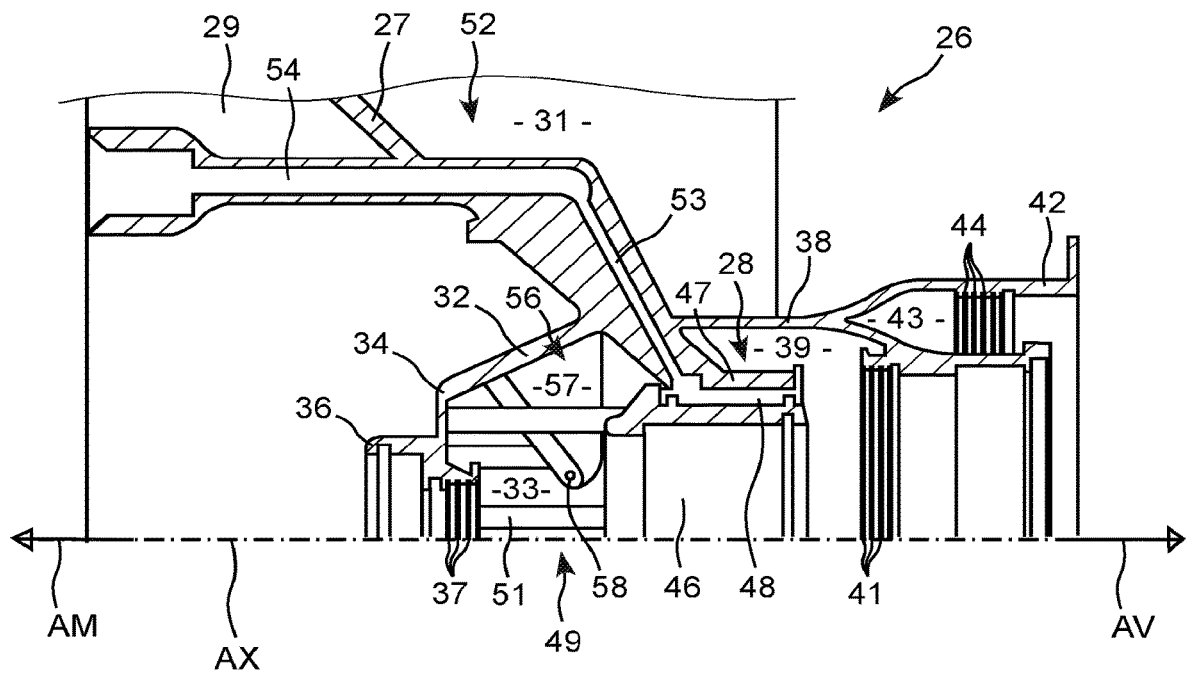
FIG. 4 is a cross-section half view of the bearing support according to the invention.

The bearing support according to the invention that appears in FIG. 4, where it is marked by 26 includes a cone 27 that widens towards the upstream from a central portion of revolution 28 to a non-visible portion for securing to a stationary element located at the edge with the largest diameter of this tapered element 27.

This support 26 has a global shape of revolution about an axis AX corresponding to the longitudinal axis of the engine wherein it is intended to be mounted, and it is oriented in such a way that the cone 27 opens or widens upstream AM of the engine and narrows downstream AV from the engine with respect to the forward direction of the engine in service.

This cone is surrounded by a cylindrical body or cylinder 29 that extends downstream the largest diameter edge thereof, to define with this cone 27 an upstream portion of a peripheral enclosure 31. This bearing support 26 includes an upstream skirt 32 carried by the cone 27 for defining an upstream enclosure 33 of the central portion 28, this skirt having a tapered shape that is reduced from the cone 27 that carries it to an upstream end 34 of this skirt.

The upstream end 34 of the skirt is extended by an upstream support 36 intended to receive a segmented radial seal not shown in FIG. 4, providing at the upstream from the enclosure 33 a seal between the bearing support and the rotating journal not shown. Additionally, this upstream support 36 includes at the inner face thereof, downstream from the receiving portion of the segmented radial seal, wipers 37 intended to supplement the seal carried by the segmented radial seal, these wipers being in contact with an outer revolution face of the journal not shown.

This bearing support 26 includes in the downstream portion thereof a first revolution element 38 carried by the cone 27, in the form of a wall that surrounds the central portion 28 while narrowing downstream, by defining a first downstream enclosure 39. This first revolution element carries at the inner face thereof wiper 41 coming into contact with an outer face of the journal not shown to provide a seal of the downstream of the enclosure 39.

A second revolution element 42 is carried by the first revolution element 38, by constituting another revolution wall that widens downstream to define a second downstream enclosure 43. This second revolution element carries at the inner face thereof of the wipers 44 coming into contact with an outer face of the journal not shown to provide a seal downstream of the enclosure 39.

This support 26 includes inside the central portion 28 thereof a sleeve 46 intended to receive an outer ring not shown of a roller bearing surrounding the journal not shown on this support 26.

More particularly, the central portion 28 comprises an annular element 47 extending the cone 27, and the sleeve 46 extends inside the annular element 47 while being radially spaced from the latter by an annular space marked by 48. The sleeve 46 is not directly connected to the annular element 47 in such a way as to benefit from a radial mobility with respect to this annular element 47, this sleeve thus having a flexible mounting.

Additionally, a ring insert not shown can be provided to be engaged in the annular space 48, in such a way as to improve the seal and the hydraulic circulation of it.

Figure 5:
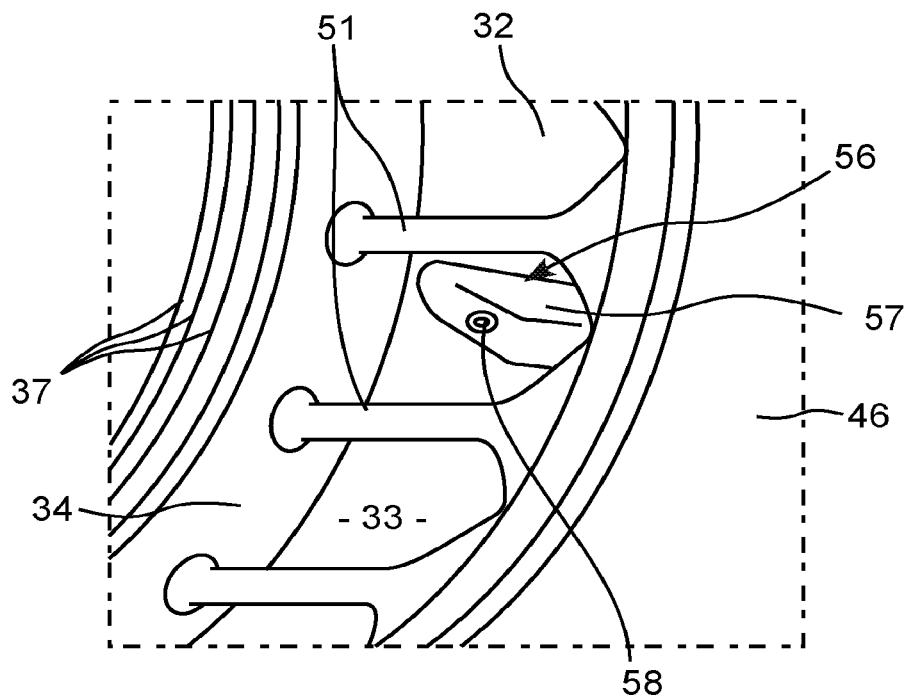
FIG. 5 is a partial view in perspective of the inside of the upstream enclosure of the bearing support according to the invention that includes a nozzle.

As can be seen in FIG. 4, the upstream end of this sleeve 46 is extended by a squirrel cage structure 49 via which the sleeve 46 is connected to the upstream end 34 of the skirt 32. The maintaining of the sleeve 46 is provided solely by the squirrel cage 49. As can be seen in FIGS. 4 and 5, the squirrel cage structure 49 is mainly formed from a series of columns 51 oriented parallel to the axis AX by being radially spaced from one another about this axis.

This squirrel cage via which the sleeve is connected to the rest of the bearing support makes it possible to provide a flexible maintaining of the bearing with respect to the rest of the support, the perforations that separate the columns thereof give it rigidity that is significantly less than the other parts of the support that are solid.

As can be seen in FIG. 4, the bearing support 26 made as a single part also integrates a feed channel 52 with oil of the annular space 48, in such a way as to form a "squeeze film" such as detailed in patent document EP1650449.

This channel 52 includes a downstream portion 53 located downstream from the cone 27, of radial orientation and that is directly connected to the annular space 48, and an upstream portion 54 oriented parallel to the axis AX, that passes through the cone 27 in such a way as to be connected to a hydraulic feed body not shown.

As can be seen in FIG. 4, the upstream enclosure 33 is passed through by the columns 51 without the latter separating it into several parts.

Additionally, the skirt 32 carries at the inner face thereof a nozzle 56 oriented towards the axis of revolution AX, including a body 57 that extends radially to the axis AX between two columns 51 ending with a nozzle 58. This nozzle 58 is thus located radially in the central region of the enclosure 33, and radially between the segmented radial seal and the roller bearing. This nozzle 58 can thus diffuse in the enclosure 33 oil to cool the segmented radial seal and lubricate the roller bearing.

The body 57 of the nozzle extends between two columns to constitute a stopping in rotation of the cage and the blocking in rotation of this cage in case of a rupture of columns.

Figure 6:
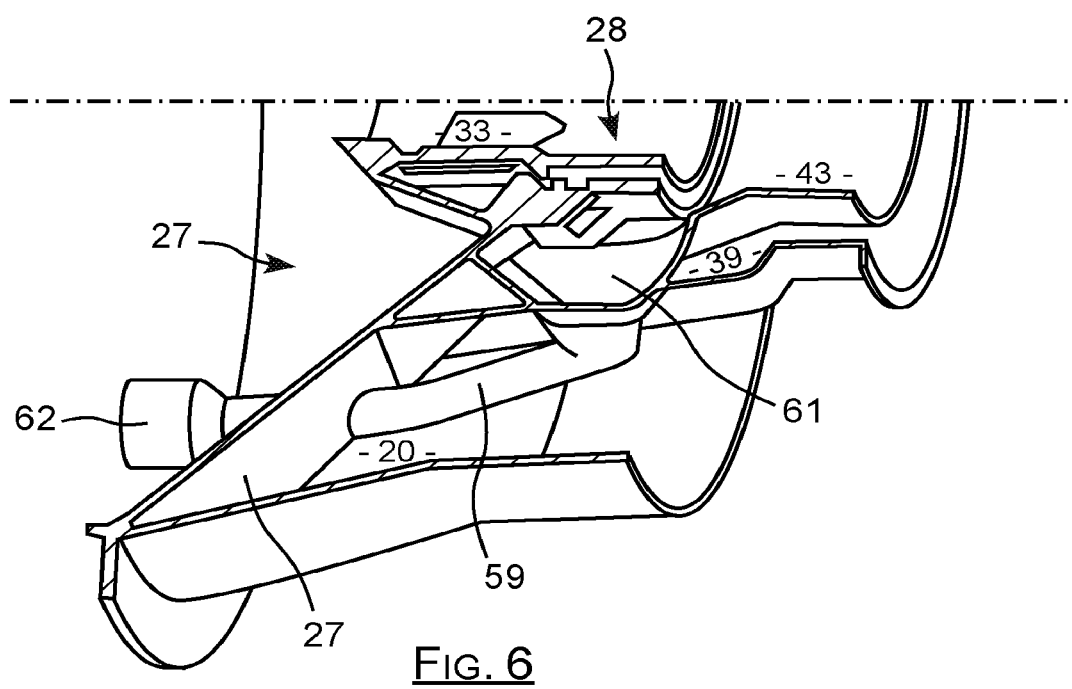
FIG. 6 is a cross-section view of the lower half of the bearing support according to the invention including an oil return path.

As can be seen in FIG. 6, the bearing support 26 formed from a single part produced by additive manufacturing also includes an integrated oil return path 59 that can be seen in FIG. 6. This path has the general shape of a tubular channel with an orientation substantially parallel to the axis AX. This path 59 extends from a manifold 61 located downstream from the cone 27, and wherein open the upstream enclosure 33 and the first downstream enclosure 39, and it passes through the cone 27 to present an upstream end 62 located substantially in line with the fastening portion of the bearing support 26. In practice, the integration of this oil return path within the bearing support produced by additive manufacturing makes it possible to avoid a drilling that would have to be carried out by vibratory drilling in the prior art.

Generally, recourse to additive manufacturing makes it possible to significantly optimise the mass of the bearing support according to the invention, due to the fact that the resistance to fatigue of the material produced by additive manufacturing is greater than the resistance to fatigue of conventional materials such as coming from a foundry, forging or machining.

Figure 7:
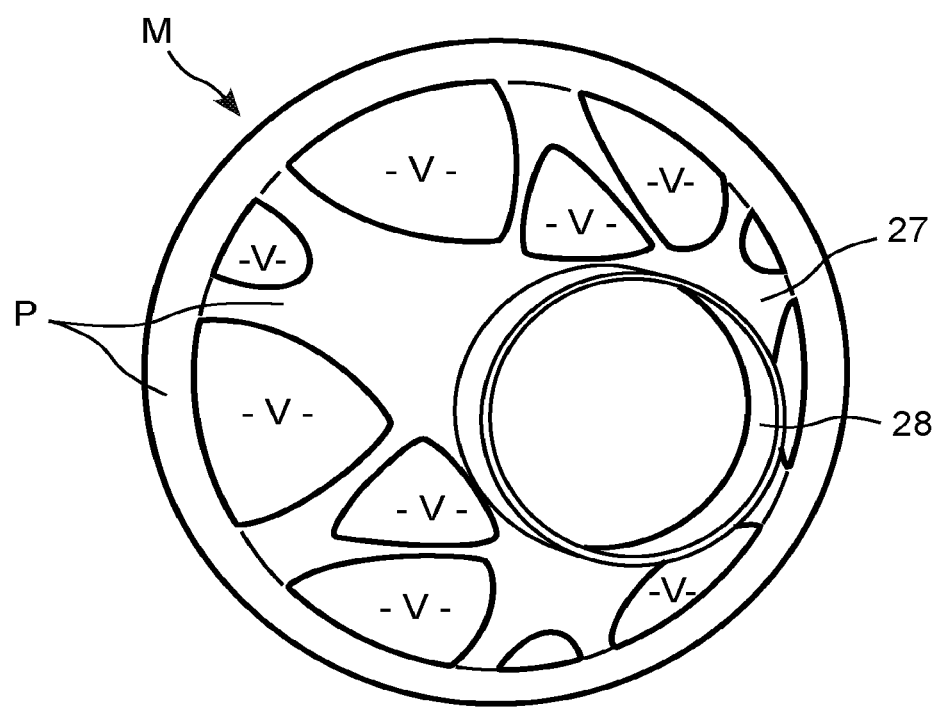
FIG. 7 shows in perspective a distribution of material for a bearing support according to the invention.

By way of example, FIG. 7 shows the product of a digital simulation determining the distribution or the topology of the material to from the bearing support with respect to the forces and cycles of stress that it undergoes, without taking into account the additional functional stresses of the seal type and others.

The model obtained marked by M, that describes a portion of the bearing support 26 comprising the cone 27 thereof, fastening face, and the central portion 28 thereof, includes solid parts P and hollow parts, marked by V which correspond to ventilation sliders not shown on the other figures.

More generally, this modelling M results in that the finished bearing support, designed for and produced by additive manufacturing includes less material than the bearing support of the prior art consisting in an assembly of forged and moulded parts, making possible in other words a significant gain in weight.

Regarding the wipers 37, 41, 44, they are formed in an abradable material that is different from the material forming the rest of the bearing support. These wipers can be formed with the rest of the bearing support by additive manufacturing by varying the composition of the powders deposited locally at these wipers in such a way as to locally constitute an abradable material.

The invention claimed is:

1. A bearing support, intended to be secured to a stationary turbojet element for supporting a journal, comprising:
   a tapered element which widens from a central portion for supporting the journal to a portion for securing to the stationary element;
   a cylindrical body extending the portion for securing to the stationary element while surrounding the tapered element;
   an upstream skirt carried by the tapered element for defining an upstream enclosure for the central portion; and
   at least one downstream revolution element carried by the tapered element for defining a downstream enclosure for the central portion,
   wherein said bearing support is made as a single part produced by additive manufacturing.

2. The bearing support according to claim 1, comprising an upstream support for a segmented radial seal extending the upstream skirt.

3. The bearing support according to claim 1, comprising a nozzle protruding from an inner face of the upstream skirt in the upstream enclosure to cool and lubricate the upstream enclosure.

4. The bearing support according to claim 1, comprising a sleeve intended to receive an outer roller bearing ring surrounding the journal, said sleeve being surrounded by the central portion, and wherein the sleeve is extended by a squirrel cage through which the sleeve is rigidly secured to an upstream end of the upstream skirt.

5. The bearing support according to claim 4, wherein the sleeve is radially spaced from the central portion that surrounds the sleeve to define an annular space intended to receive a hydraulic flow.

6. The bearing support according to claim 5, comprising a feed channel of the annular space surrounding the sleeve, said channel passing through the tapered element.

7. The bearing support according to claim 1, comprising an oil return path connected to at least one of the upstream enclosure and the downstream enclosure via a manifold, said oil return path passing through the tapered element.

8. A turbojet comprising a bearing support according to claim 1.

9. The bearing support according to claim 5, wherein the central portion comprises an annular element extending the tapered element, the sleeve extends inside the annular element, and the sleeve is not directly connected to the annular element.

10. The bearing support according to claim 7, wherein an upstream end of the oil return path is located substantially in line with the portion for securing to the stationary element.

* * * * *